(12) United States Patent
Nelson et al.

(10) Patent No.: US 8,640,293 B2
(45) Date of Patent: Feb. 4, 2014

(54) CLOSURE FOR A PIPELINE PIG SENDER OR RECEIVER

(75) Inventors: David Nelson, Grande Prairie (CA);
Allen Barker, Grande Prairie (CA);
Trent Nowicki, Grande Prairie (CA)

(73) Assignee: Allen Barker, Grand Prairie (CA)

( * ) Notice: Subject to any disclaimer, the term of this patent is extended or adjusted under 35 U.S.C. 154(b) by 313 days.

(21) Appl. No.: 13/225,336

(22) Filed: Sep. 2, 2011

(65) Prior Publication Data
US 2012/0054978 A1   Mar. 8, 2012

(30) Foreign Application Priority Data
Sep. 3, 2010  (CA) ...................................... 2714132

(51) Int. Cl.
*F16L 55/46*   (2006.01)

(52) U.S. Cl.
USPC ........................... 15/3.51; 15/3.5; 15/104.062

(58) Field of Classification Search
USPC ........... 15/3.51, 3.5, 104.062; 137/15.07, 268
See application file for complete search history.

(56) References Cited

U.S. PATENT DOCUMENTS

| | | | | |
|---|---|---|---|---|
| 3,779,270 A | * | 12/1973 | Davis | 137/268 |
| 4,351,079 A | * | 9/1982 | Fitzpatrick | 15/104.062 |
| 4,709,719 A | | 12/1987 | Littleton | |
| 5,186,757 A | * | 2/1993 | Abney, Sr. | 134/8 |
| 6,079,074 A | * | 6/2000 | Ellett | 15/104.062 |
| 6,769,152 B1 | | 8/2004 | Crenshaw | |
| 2012/0090414 A1 | * | 4/2012 | Kearns et al. | 73/865.8 |

* cited by examiner

*Primary Examiner* — Laura C Guidotti
(74) *Attorney, Agent, or Firm* — Christensen O'Connor Johnson Kindness PLLC

(57) ABSTRACT

A closure for pipeline pig sender or receiver includes a primary closure body and a secondary closure body. The primary closure body has an outer face, an inner face and a port extending therethrough from the outer face to the inner face. The primary closure body is secured to the pipeline pig sender or receiver sealing a closure end when the primary closure body is in the closed position. The secondary closure body closes the port on the primary closure body. The secondary closure body is movable between a closed position and an open position to enable an operator to insert a tool through the port into the diversionary passage to manipulate the pipeline pig and release trapped pressure prior to opening the closure. The secondary closure body is secured to the primary closure body sealing the port when the secondary closure body is in the closed position.

1 Claim, 2 Drawing Sheets

CLOSURE FOR A PIPELINE PIG SENDER OR RECEIVER

FIELD

There is described a closure for a pipeline pig sender or receiver used to launch pipeline pigs into or retrieve pipeline pigs from pipelines. The closure is moved from a closed position to an open position to remove the pipeline pigs from the pipeline pig sender or receiver.

BACKGROUND

Pipeline pigs are used in pipelines to perform a wide variety of cleaning, scraping, inspecting, monitoring, and logging functions. A pipeline pig retriever is used to recover a pipeline pig from a pipeline after it has performed its intended function. U.S. Pat. Nos. 4,709,719 and 6,769,152 provide examples of pipeline pig retrievers. Each pipeline pig retriever has a vertically oriented or horizontally oriented tubular body providing a diversion passage into which the pipeline pig is diverted from the pipeline. The tubular body has a pipeline end and a closure end. The pipeline end is connected to the pipeline and has a valve to selectively connect the diversionary passage of the tubular body to the pipeline or isolate the tubular body from the pipeline. The closure end has a closure that is opened to remove the pipeline pig. There have been a number of accidents in which operators have been injured when retrieving pipeline pigs. In each case, the pipeline pig has become temporarily wedged part way along the tubular body with gas trapped behind it. When the closure was opened and the operator dislodged the pipeline pig, the pipeline pig was propelled rapidly forward by the trapped pressure causing the pipeline pig to strike the operator. What is required is a safe method for detecting and releasing the stored up energy caused by the trapped pressure.

SUMMARY

There is provided a closure for a pipeline pig sender or receiver which includes a primary closure body and a secondary closure body. The primary closure body has an outer face, an inner face and a port extending therethrough from the outer face to the inner face. The primary closure body is secured to the pipeline pig sender or receiver sealing the closure end of the pipeline pig sender or receiver when the primary closure body is in the closed position. The secondary closure body closes the port on the primary closure body. The secondary closure body is movable between a closed position and an open position to enable an operator to insert a tool through the port into the diversionary passage to manipulate the pipeline pig and release trapped pressure prior to opening the closure. The secondary closure body is secured to the primary closure body sealing the port when the secondary closure body is in the closed position.

With the above described closure, the operator can check for gas trapped behind the pipeline pig from safety by extending a tool though the port. Should there be trapped pressure which results in the pipeline pig being propelled violently forward, the primary closure body is still in the closed position and provides protection to the operator.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
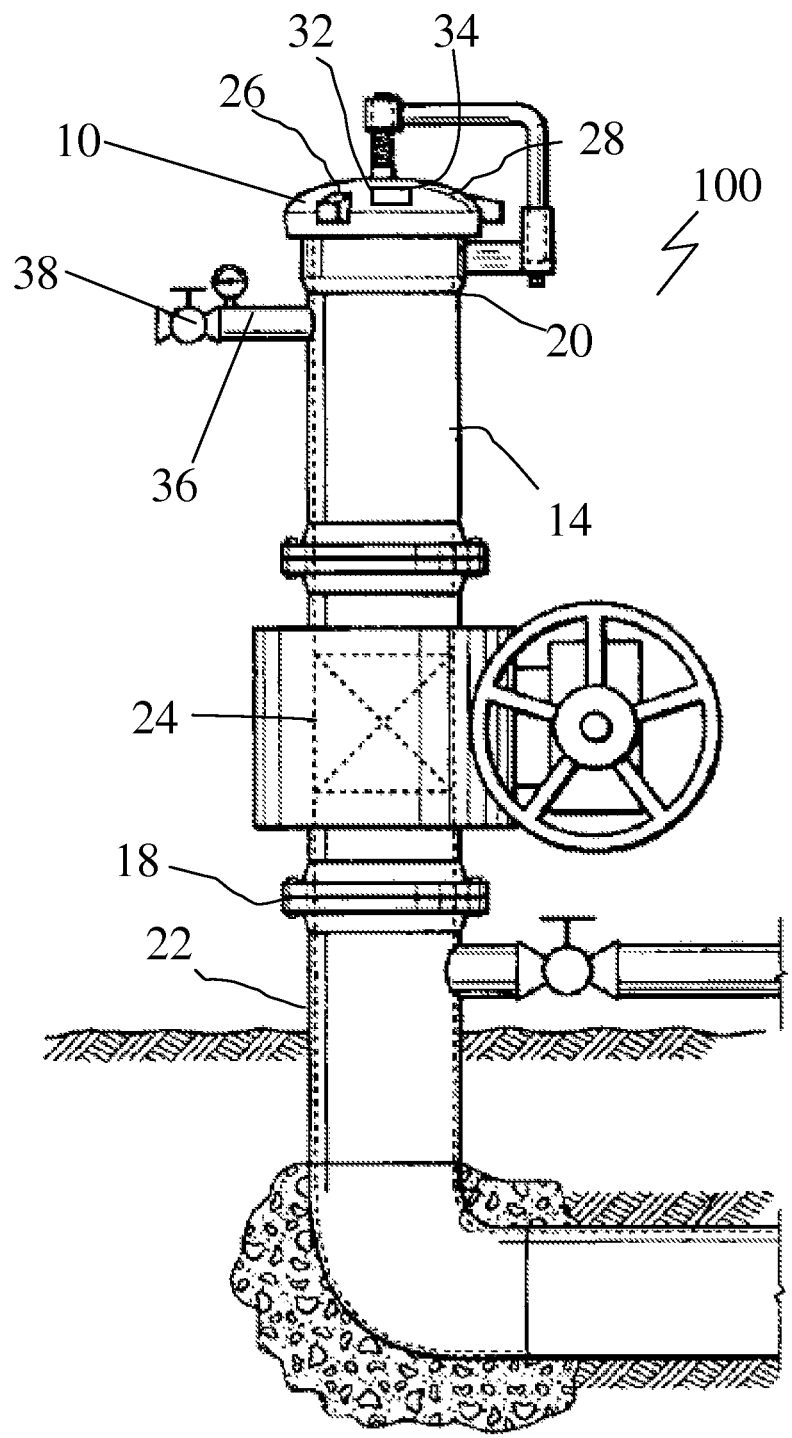
FIG. 1 is a side elevation view of a closure for a vertically oriented pipeline retriever.

A closure, generally identified by reference numeral 10, for a pipeline pig sender or receiver, generally identified by reference numeral 100, will now be described with reference to FIG. 1 and FIG. 2.

Figure 2:
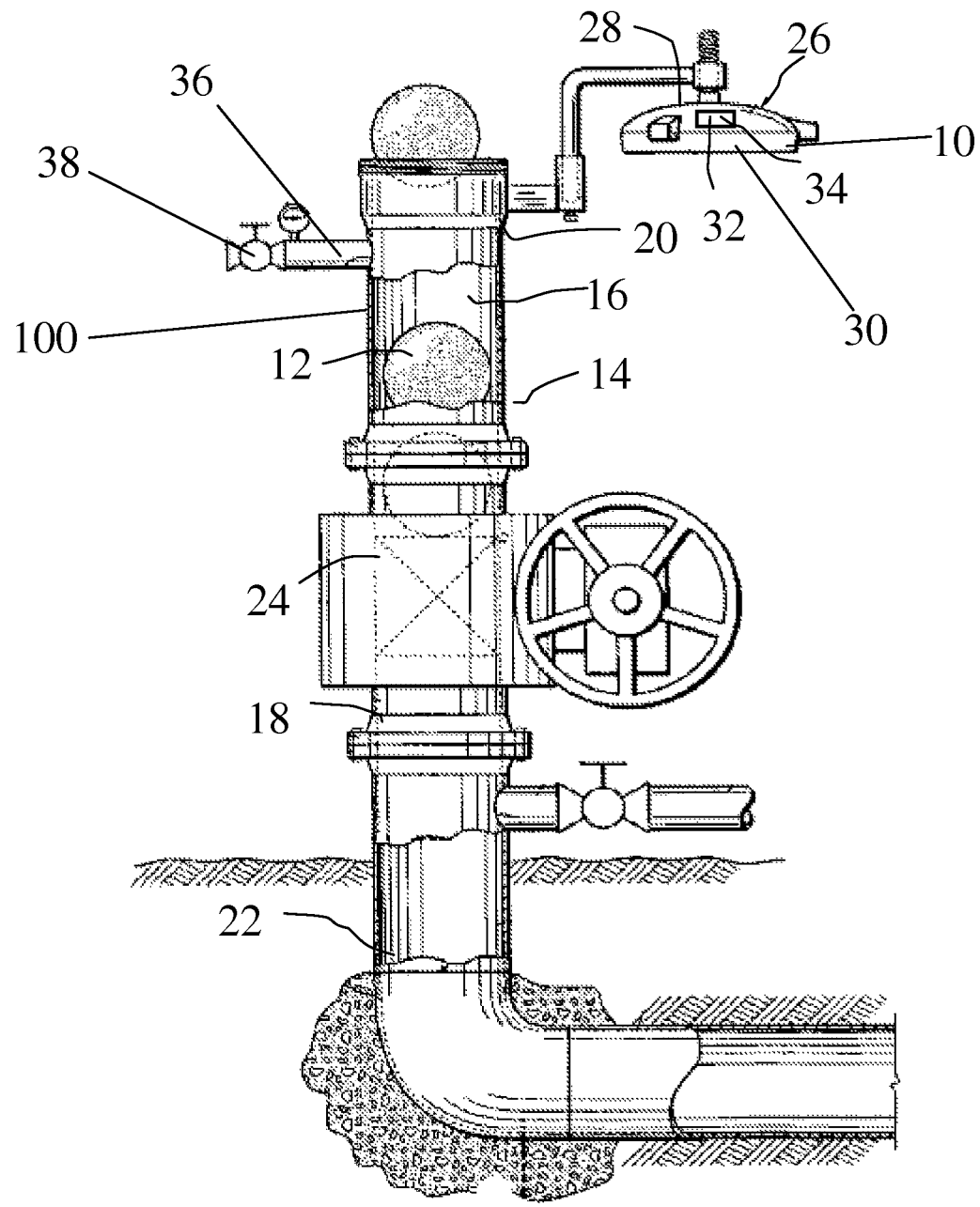
FIG. 2 is a side elevation view, in section, of the closure for the pipeline retriever illustrated in FIG. 1.

Structure and Relationship of Parts:

Referring to FIG. 1 and FIG. 2, pipeline pig sender or receiver 100 has a tubular body 14 defining a diversionary passage 16. Tubular body 14 has a pipeline end 18 and a closure end 20. Pipeline end 18 is connected to a pipeline 22 with a valve 24 selectively connecting tubular body 14 to pipeline 22 or isolating tubular body 14 from pipeline 22. Closure 10 is positioned at closure end 20. Closure 10 has a closure body 26 movable from a closed position shown in FIG. 1 to an open position shown in FIG. 2 to enable removal of a pipeline pig 12 from tubular body 14. Referring to FIG. 2, primary closure body 26 has an outer face 28 and an inner face 30 and a port 32 extending through primary closure body 26 from outer face 28 to inner face 30. Primary closure body 26 is secured to pipeline pig sender or receiver 100 and seals closure end 20 when primary closure body 26 is in the closed position. A secondary closure body 34 closes port 32 on primary closure body 26. Secondary closure body 34 is movable between a closed position and an open position to enable an operator to insert a tool through port 32 into diversionary passage 16 to manipulate pipeline pig 12 and release trapped pressure prior to opening closure body 26. Secondary closure body 34 is secured to primary closure body 26 sealing port 32 when secondary closure body 34 is in the closed position.

Operation:

Referring to FIG. 1 and FIG. 2, pipeline pigs 12 are moved from pipeline 22 into diversionary passage 16 by opening valve 24 when both primary closure closure body 26 and secondary closure body 34 of closure 10 are both in the closed position. Once pipeline pigs 12 are within diversionary passage 16, valve 24 is closed. Gas is then bled from diversionary passage 16 through outlet conduit 36, flow through which is controlled by valve 38. In the prior art, primary closure body 26 would be opened and a tool would be inserted to hook onto pipeline pig 12 and lift it out of diversionary passage 14. The tool most commonly used was a pole with a grappling hook at one end (not shown). However, as previously described, this proved to be dangerous if gas was trapped between valve 24 and pipeline pig 12. The alternative procedure provided by closure 10 is to remove secondary closure body 34 while leaving primary closure body 26 securely in place. The tool, not shown, may then be inserted through port 32 into divisionary passage 16 to manipulate pipeline pig 12. If there is gas trapped behind pipeline pig 12, when it is disturbed it will be propelled violently toward primary closure body 26. However, primary closure body 26 will limit any further travel and the remaining gas will be bled through outlet conduit 36. Once the gas has been released and pipeline pig 12 has fallen back down diversionary passage 16, primary closure body 26 may be safely opened for removal of pipeline pigs 12 from pipeline pig sender or receiver 100.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The following claims are to be understood to include what is specifically illustrated and described above, what is conceptually equivalent, and what can be obviously substituted. Those skilled in the art will appreciate that various adaptations and modifications of the described embodiments can be configured without departing from the scope of the claims. The illustrated embodiments have been set forth only as examples and should not be taken as limiting the invention. It is to be understood that, within the scope of the following claims, the invention may be practiced other than as specifically illustrated and described.

What is claimed is:

1. A closure for a pipeline pig sender or receiver having a tubular body defining a diversionary passage, the tubular body having a pipeline end and a closure end, the pipeline end being connected to a pipeline with a valve selectively connecting the tubular body to the pipeline or isolating the tubular body from the pipeline, the closure end having a closure movable from a closed position to an open position to enable removal of a pipeline pig from the tubular body, the closure comprising:

a primary closure body having an outer face, an inner face and a port extending therethrough from the outer face to the inner face;

means for securing the primary closure body to the pipeline pig sender or receiver sealing the closure end when the primary closure body is in the closed position;

a secondary closure body closing the port on the primary closure body, the secondary closure body being movable between a closed position and an open position to enable an operator to insert a tool through the port into the diversionary passage to manipulate the pipeline pig and release trapped pressure prior to opening the closure; and means for securing the secondary closure body to the primary closure body sealing the port when the secondary closure body is in the closed position.

\* \* \* \* \*